United States Patent
Anvari (10) Patent No.: US 9,961,688 B1
(45) Date of Patent: May 1, 2018

(54) CLOUD RAN ARCHITECTURE (71) Applicant: Kiomars Anvari, Walnut Creek, CA (US)

(72) Inventor: Kiomars Anvari, Walnut Creek, CA (US)

(73) Assignee: Kiomars Anvari, Walnut Creek, CA (US)

( * ) Notice: Subject to any disclaimer, the term of this patent is extended or adjusted under 35 U.S.C. 154(b) by 94 days.

(21) Appl. No.: 15/186,522

(22) Filed: Jun. 19, 2016

Related U.S. Application Data (60) Provisional application No. 62/191,472, filed on Jul. 12, 2015.

(51) Int. Cl.
| | |
|---|---|
| *H04L 12/26* | (2006.01) |
| *H04W 72/04* | (2009.01) |
| *H04W 72/08* | (2009.01) |
| *H04L 12/801* | (2013.01) |
| *H04W 88/08* | (2009.01) |

(52) U.S. Cl.
CPC ....... *H04W 72/0486* (2013.01); *H04L 47/193* (2013.01); *H04W 72/048* (2013.01); *H04W 72/082* (2013.01); *H04W 88/085* (2013.01)

(58) Field of Classification Search
None
See application file for complete search history.

(56) References Cited

U.S. PATENT DOCUMENTS

| | | | | |
|---|---|---|---|---|
| 2013/0100948 | A1* | 4/2013 | Irvine | H04J 3/0632 370/350 |
| 2014/0018090 | A1* | 1/2014 | Khoryaev | H04W 52/04 455/452.1 |
| 2014/0031049 | A1* | 1/2014 | Sundaresan | H04W 16/02 455/447 |
| 2014/0185601 | A1* | 7/2014 | Ilyadis | H04W 28/06 370/338 |
| 2014/0226552 | A1* | 8/2014 | Niu | H04W 4/06 370/312 |
| 2015/0173084 | A1* | 6/2015 | Chou | H04L 5/0037 370/252 |
| 2015/0236785 | A1* | 8/2015 | Lamb | H04B 10/25752 398/116 |
| 2015/0372728 | A1* | 12/2015 | Rahman | H04B 7/0456 370/329 |
| 2016/0212747 | A1* | 7/2016 | Effenberger | H04W 72/0453 |

OTHER PUBLICATIONS

Peng et al., "Fronthaul-Constrained Cloud Radio Access Networks: Insights and Challenges", Mar. 4, 2015, IEEE Wireless Communications, vol. X, No. Y, MON. 2014, all pages.*

* cited by examiner

*Primary Examiner* — Otis L Thompson, Jr.

(57) ABSTRACT

A novel cloud RAN architecture which allows pooling the baseband resources to optimize both CAPEX and OPEX. The cloud baseband unit provides a pool of LTE channel baseband signal processing elements that can be assigned to remote radio units based on the traffic load. The LTE channel baseband element or elements can also be shared among a group of remote radio units.

20 Claims, 9 Drawing Sheets

LTE System Parameters

| Channel Bandwidth (MHz) | 1.25 | 2.5 | 5 | 10 | 15 | 20 |
|---|---|---|---|---|---|---|
| Frame Duration (ms) | 10 | | | | | |
| Sub-Frame Duration (ms) | 1 | | | | | |
| Sub-carrier Spacing (KHz) | 15 | | | | | |
| Sampling Frequency (MHz) | 1.92 | 3.84 | 7.68 | 15.36 | 23.04 | 30.72 |
| FFT Size | 127 | 256 | 512 | 1024 | 1536 | 2048 |
| Occupied sub-carries (inc. DC sub-carrier) | 76 | 151 | 301 | 601 | 901 | 1201 |
| Guard Sub-carriers | 52 | 105 | 211 | 423 | 653 | 847 |
| Number of Resource Blocks | 6 | 12 | 25 | 50 | 75 | 100 |
| Occupied Channel BW (MHz) | 1.14 | 2.265 | 4.515 | 9.015 | 13.515 | 18.015 |

SNR Requirement Versus Coding Rate and Modulation Scheme

Required Baseband SNR

| Modulation | Code Rate | SNR (dB) |
|---|---|---|
| QPSK | 2/3 | 4.3 |
| QPSK | 3/4 | 5.5 |
| QPSK | 4/5 | 6.2 |
| 16QAM | 2/3 | 11.3 |
| 16QAM | 3/4 | 12.2 |
| 16QAM | 4/5 | 12.8 |
| 64QAM | 2/3 | 15.3 |
| 64QAM | 3/4 | 17.5 |
| 64QAM | 4/5 | 18.6 |

CLOUD RAN ARCHITECTURE

The application claims priority to the following related application and included here is as a reference.

Provisional application: U.S. patent application No. 62/191,472 filed Jul. 12, 2015, and entitled "A NOVEL CLOUD RAN ARCHITECTURE".

This application is a continuation of application Ser. Nos. 62/162,797, 62/170,665, 15/145,536 and 15/163,119 the entirety of which is expressly incorporated by reference herein

BACKGROUND

Mobile data is increasing at a compound annual rate of far more than 100% as a result of an increasing level of penetration of data-intensive devices and an increasing level of usage per device. These devices are getting smarter due to improved user interfaces, vastly increased numbers of applications, faster processors, and improved radio access technologies, therefore are consuming increasing amounts of data.

Data volumes are growing at a rate that exceeds operators' ability to grow capacity. Capacity growth typically comes from growth in the number of sites, from increased spectrum resources, and from enhancements in radio access technology.

Long Term Evolution (LTE) technology, standardized by the Third Generation Partnership Project (3GPP), has emerged as the next generation wireless technology that will lead the growth of mobile broadband services in the next decade. Its adoption by service providers around the world has the potential to generate economies of scale unprecedented by any previous generation of wireless networking technology as it becomes the universal 4G/5G mobile platform used by all service providers.

LTE is critical to delivering the lower cost per bit, higher bandwidth, and subscriber experience needed to address the challenges of mobile broadband. It has the potential to transform how subscribers and machines use applications and content distributed over mobile and converged networks. The effect will be to increase the value of these networks and create favorable conditions for the continued mass market adoption of mobile broadband services.

The reality is that, we have reached a point where an increase in number of conventional sites and available spectrum can no longer keep up with the explosion in demand for mobile data capacity—actually falling short by an entire order of magnitude in recent years. What other options exist? One possibility is architectural innovation. What if the definition of a "cell site" were radically changed, in such a way that the number of "sites" dramatically increased and the cost per unit of capacity (after adjusting for the inevitable lower utilization of smaller sites) significantly decreased?

This capacity gap drives deployment of at least one order-of-magnitude more "small cells"—making up for the difference by means of spectrum re-use. In order to provide consistent capacity density across a mobile service area, these deployments need to take place in a more "distributed" manner—forcing operators to expand beyond the current foot-print for the deployment of more mobile broadband radios. In many cases, operators need to acquire more and new types of cell locations to deploy data-centric wireless broadband service networks. These cell locations then determine the required type of "small cell" equipment to build a heterogeneous mobile radio access network.

In next decade, Web-scale IT will be an architectural approach found operating in most of global enterprises, up from less than 10 percent in 2013. Web-scale IT is a pattern of global-class computing that delivers the capabilities of large cloud service providers within an enterprise IT setting by rethinking positions across several dimensions.

Large cloud services providers such as Amazon, Google, Facebook, etc., are reinventing the way in which IT services can be delivered. Their capabilities go beyond scale in terms of sheer size to also include scale as it pertains to speed and agility. If enterprises want to keep pace, then they need to emulate the architectures, processes and practices of these exemplary cloud providers.

Web-scale IT looks to change the IT value chain in a systemic fashion. Data centers are designed with an industrial engineering perspective that looks for every opportunity to reduce cost and waste. Web-oriented architectures allow developers to build very flexible and resilient systems that recover from failure more quickly.

Web-scale IT refers to a global-class of computing or architectural approach used to deliver the capabilities of large cloud service providers within an enterprise IT setting. The approach is to design, build and manage data center infrastructure where capabilities go beyond scale in terms of size to include scale as it pertains to speed and agility. Web-scale IT is simply defined as all the things happening at large cloud service firms, such as Google, Amazon, Netflix, Facebook and others, that enables them to achieve extreme levels of agility and scalability by applying new processes and architectures.

Web-scale IT methodology pertains to designing, deploying and managing infrastructure at any scale and can be packaged in a number of ways to suit diverse requirements and can scale to any size of business or enterprise. It is not a single technology implementation, but rather a set of capabilities of an overall IT system.

A Centralized-Radio Access Network (RAN) architecture, also known as Cloud-RAN or C-RAN, is garnering attention for its ability to meet all of the above needs while supporting mobile fronthaul and backhaul, network self-optimization, self-configuration and self-adaptation through self-organizing network functionality (SON).

The Cloud RAN concept lowers operating expenses and simplifies the deployment process. By centralizing all the active electronics of multiple cell sites, at one location, energy, real-estate and security costs are minimized. The remote radio unit (RRU) can be mounted outdoor or indoor—on poles, sides of buildings or anywhere a power and a broadband connection exist, making installation less costly and easier. The RRU is typically connected using fiber to the Cloud, creating cloud-like radio access network topology. This topology saves costs both during the installation and later in the on-going operation.

One of the essential components of a web-scaled infrastructure is the backhaul between the remote radio head and the cloud RAN. Since the baseband signal processing is performed in the cloud the signal that the backhaul carry between cloud and remote radio unit is baseband samples and control signals. Therefore, the backhaul needs to support very high bandwidth with very low loss of packets, and acceptable latency.

This application discloses a novel cloud architecture which allows for pooling the cloud RAN recourses to optimize both OPEX and CAPEX.

BRIEF DESCRIPTION OF THE DRAWINGS

FIG. 1.a through 1.e illustrates an embodiment of LTE system parameters.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
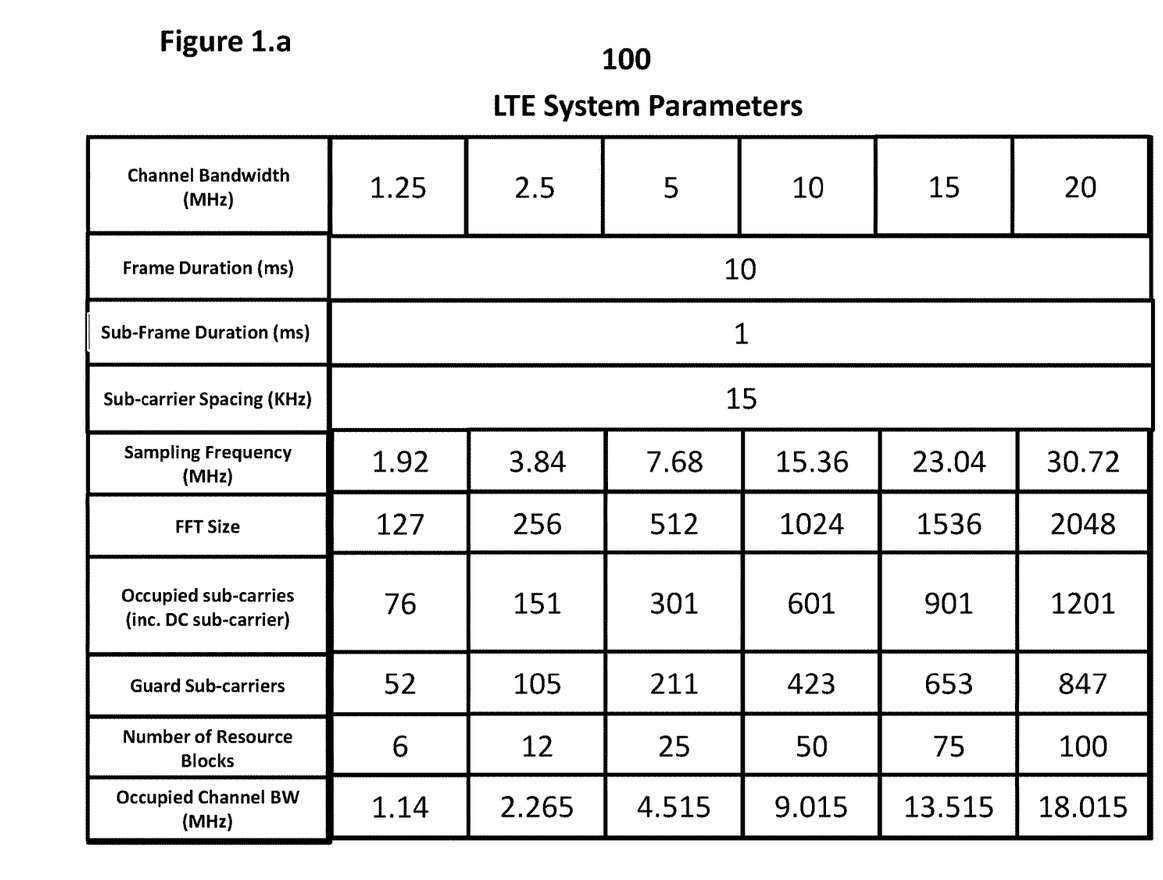

FIG. 1 depicts the LTE system parameters 100. FIG. 1.*a* shows the lowest channel bandwidth is 1.25 (1.4) MHz and the highest channel bandwidth is 20 MHz. The sample rates for 1.25 (1.4) MHz channel bandwidth is 1.92 msps and for 20 MHz channel bandwidths is 30.72 msps. LTE is an OFDM technology and the channel bandwidth is divided into sub-carriers with 15 KHz spacing. In frequency domain, the number of sub-carriers ranges from 128 to 2048 depending on channel bandwidth. Not all the sub-carriers are modulated (i.e. used). The DC sub-carrier is not used as well as sub-carriers either side of the channel: approximately 10% of sub-carriers are used as guard carriers. A resource block (RB) in LTE comprises of twelve sub-carriers. A subscriber can be assigned minimum of 6 RB and a maximum of entire LTE channel bandwidth. The total number of RBs in the lowest channel bandwidth is 6 and in the 20 MHz channel bandwidth is 100. The transmission can be scheduled by resource blocks (RB) each of which consists of 12 consecutive sub-carrier, or 180 KHz, for the duration of one slot (0.5 ms). A resource element (RE) is the smallest defined unit which consists of one OFDM sub-carrier during one OFDM symbol interval. Each resource block consists of 12×7 resource elements. The uplink transmission structure is similar to downlink. In time domain, the radio frame has a length of 10 ms. Each frame is divided in 10 equally sized sub-frames of 1 ms in length as shown in FIG. 1.*b*.

A user equipment (UE) wishing to access LTE system follows a cell search procedure which includes a series of synchronization stages by which the UE determines time and frequency parameters that are necessary to demodulate downlink signals, to transmit with correct timing and to acquire some critical system parameters. There are two cell search procedures in LTE: one for initial synchronization and another for detecting neighbor cells in preparation for handover. In both cases, the UE uses two special signals broadcast on each cell: primary synchronization sequence (PSS) and secondary synchronization sequence (SSS). The detection of these signals allows the UE to complete time and frequency synchronization and to acquire useful system parameters. At this stage as shown in FIG. 1.*c*, the UE can also decode the physical broadcast control channel and obtain important system information.

Synchronization signals are transmitted twice per 10 ms radio frame. The PSS is located in the last OFDM symbol of the first and $11^{th}$ slot of each radio frame which allows the UE to acquire the slot boundary timing. The location of SSS immediately precedes the PSS—in the before to last symbol of the first and $11^{th}$ slot of each radio frame.

In the frequency domain, the PSS and SSS occupy the central six resource blocks, irrespective of the system channel bandwidth, which allows the UE to synchronize to the network without a priori knowledge of allocated bandwidth. The synchronization sequences use 62 sub-carriers in total, with 31 sub-carries mapped on each side of the DC sub-carrier which is not used. This leaves 5 sub-carriers at extremity of the 6 central RBs unused.

Figure 4:
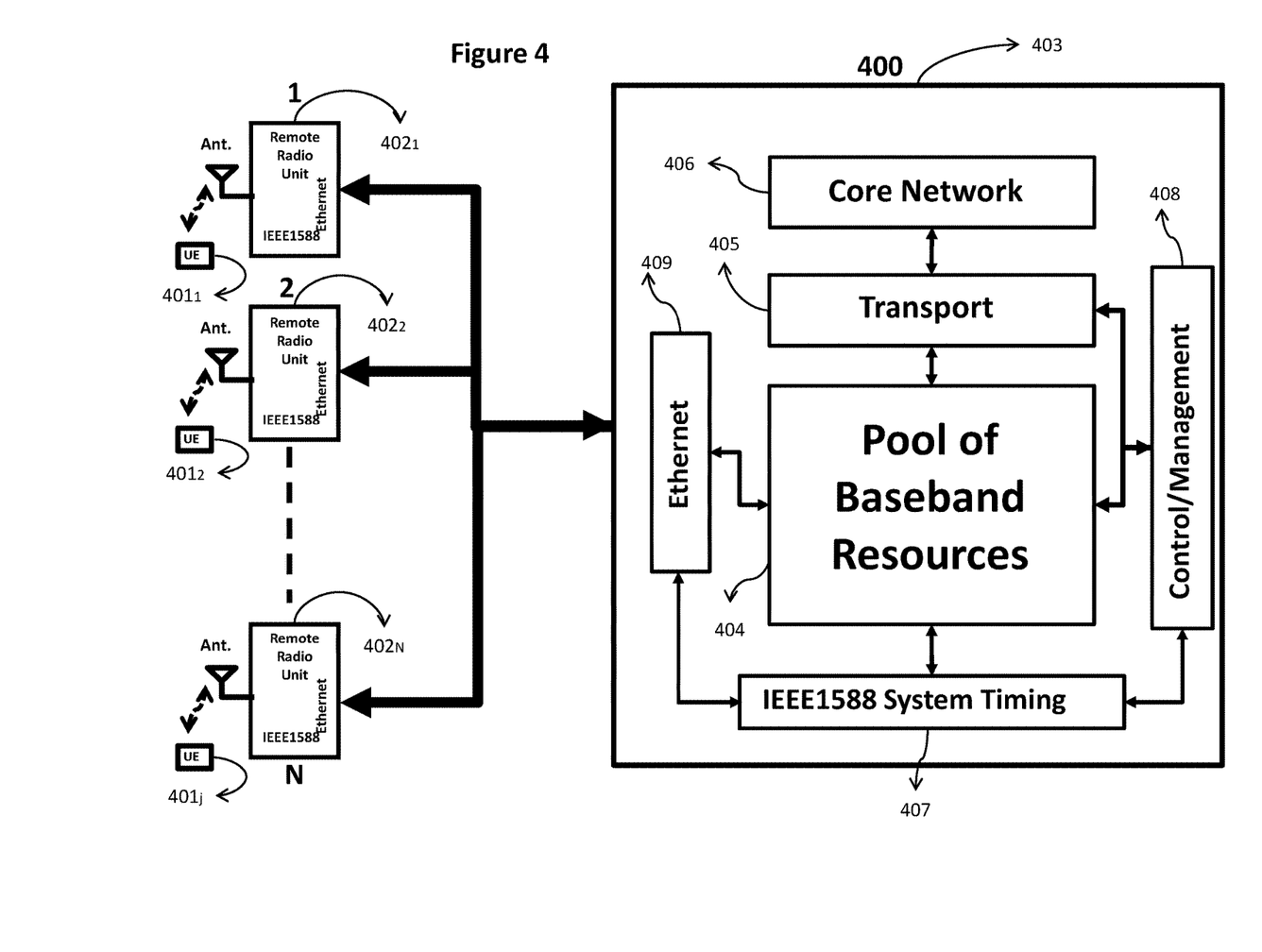
FIG. 4 shows an embodiment of Cloud RAN architecture using baseband pooling.

Random access channel carries the random access preamble a UE sends to access the network in a unsynchronized mode and used to allow the UE to synchronize timing with the network. It consists of 72 sub-carriers in the frequency domain (6 resource blocks) as shown in FIG. 4.*d*. The position of LTE random access preamble is defined by RACH frequency offset parameter which is sent to UE by network.

FIG. 1.*e* illustrates the required SNR versus coding rate requirements for various modulation schemes. These are the theoretical minimum SNR at baseband demodulation input. It can be seen that required SNR changes with coding rate and modulation scheme. Therefore, by increasing the coding rate or using a lower level modulation scheme the required SNR can be decreased. This approach is used in embodiments of this patent application.

Figure 2:
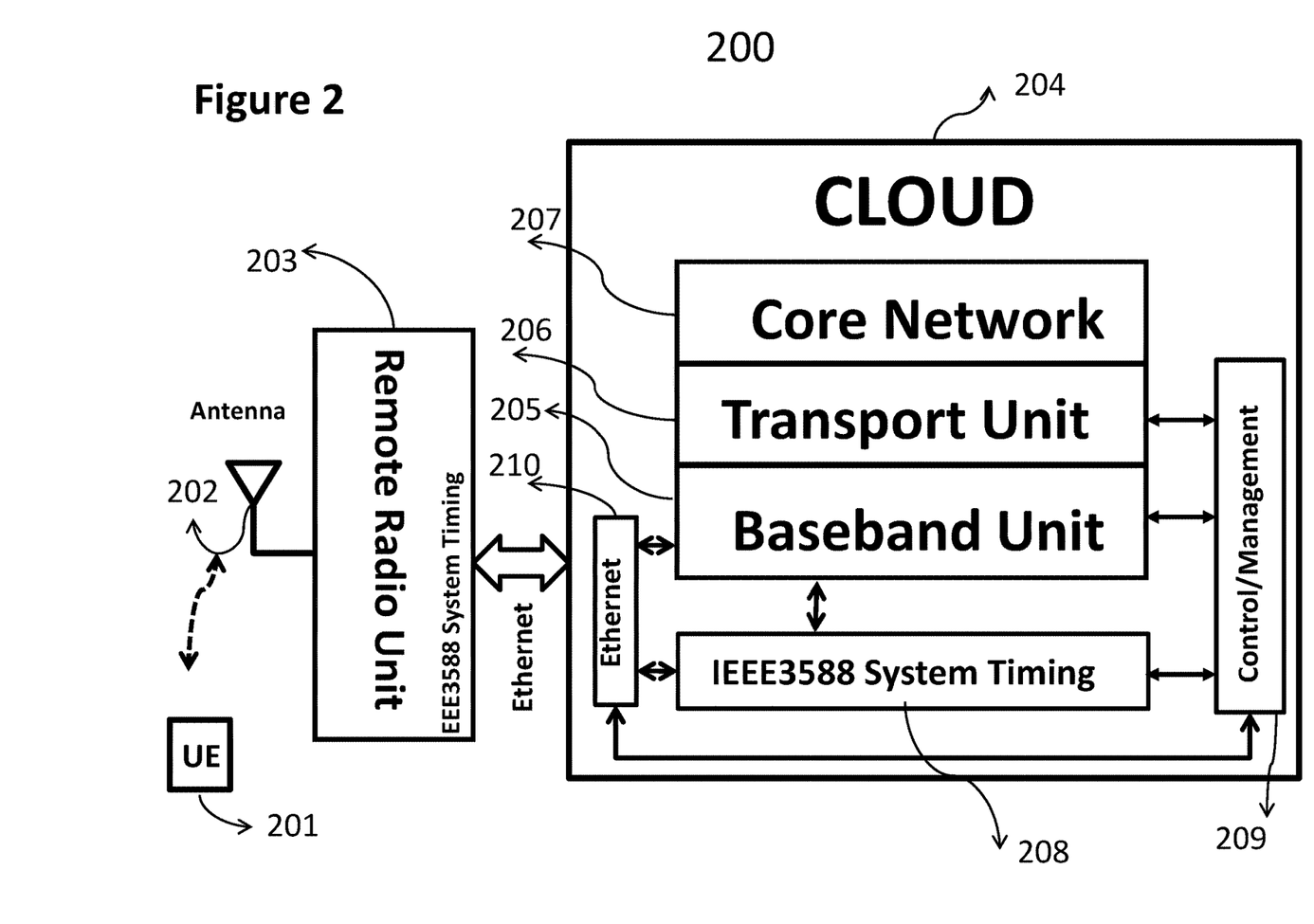
FIG. 2 illustrates embodiments of a packet based cloud Radio Access Network (RAN).

FIG. 2 illustrates an embodiment of cloud RAN 200. In general, cloud RAN 200 facilitates communication between user equipment (UE) 201 and core network 207. Signal sent by UE 201 is received by antenna 202 and translated to baseband signal by remote radio unit 203. The baseband signal from remote radio unit 203 with IEEE1588 timing is sent through asynchronous link to the cloud 204 that accommodates baseband unit 205, transport unit 206, core network 207, IEEE1588 system timing 208, control/management 209 and Ethernet port 210. The detected signal from baseband unit 205 is transported to core network 207 by transport unit 206.

The cloud RAN 200 uses IEEE1588 to synchronize the cloud 204 with remote radio unit 203. The Ethernet packets received by cloud 204 from remote radio units (remote radio 203 being one of them) through asynchronous link have a remote radio identifier and are time stamped, have a sequence number or both.

The baseband unit 205 uses memory blocks to store the received baseband sample streams from remote radio units (remote radio unit 203 being one of them) based on their identifier, time tag or sequence number to avoid any early and late Ethernet packets. The memory size of the baseband unit block 205 is far more than the maximum delay jitter of Ethernet packets received from the remote radio units (remote radio 203 being one of them).

The baseband unit 205 uses the timing and control information obtained from IEEE1588 system timing block 208 and control/management block 209 to format and combine various baseband sample streams for detection.

The baseband unit 205 uses the timing and control information obtained from IEEE1588 system timing block 208 and control/management block 209 to format, time stamp, number and tag various baseband sample streams for transmission to remote radio units (remote radio 203 being one of them).

The Ethernet block 210 provides the physical layer for the cloud 204 Ethernet port. It identifies the IEEE1588 timing packets, control/management packets, and baseband sample packets and sends them to IEEE1588 system timing block 208, control/management block 209, and baseband unit 205.

The Ethernet block 210 receives the IEEE1588 timing packets, control/management packets, and baseband sample stream packets from IEEE1588 system timing block 208, control/management block 209, and baseband unit 205 and sends them to remote radio units (remote radio 203 being one of them).

The IEEE1588 system timing block 208 receives the timing packets from Ethernet block 210 and retrieves synchronization and time of the day information. The IEEE1588 system timing block 208 through the Ethernet block 210 communicates and exchanges timing packets with another node in the network to obtain and maintain synchronization and time of the day. The IEEE1588 system timing block 208 uses the clock synchronization information to create clocks and reference frequencies for the cloud 204.

The IEEE1588 system timing block 208 through the Ethernet block 210 communicates and exchanges timing packets with each remote radio units (remote radio 203 being one of them) to estimate packets traveling time between cloud 204 and remote radio units.

The IEEE1588 system timing block 208 shares time of the day information and packets traveling times between remote radio units and the cloud 204 with control/management block 209 and baseband unit 205. The IEEE1588 system timing block 208 can use SYNCE or other synchronization techniques (assisted GPS, NTP, etc.) for synchronizing remote radio units (remote radio 203 being one of them) and the cloud 204.

The control/management block 209 performs control and management of the baseband unit 205, IEEE1588 system timing 208, and transport unit 206. It also monitors the cloud 204 for any alarm or mal-function and report the collected information to higher layers.

The control/management block 209 based on the control data received from remote radio units (remote radio 203 being one of them) provides control for baseband sample streams detection in baseband unit 205. The control/management block 209 works as part of cloud RAN Self Organizing Network (SON) and carry out tasks required by SON.

Figure 3:
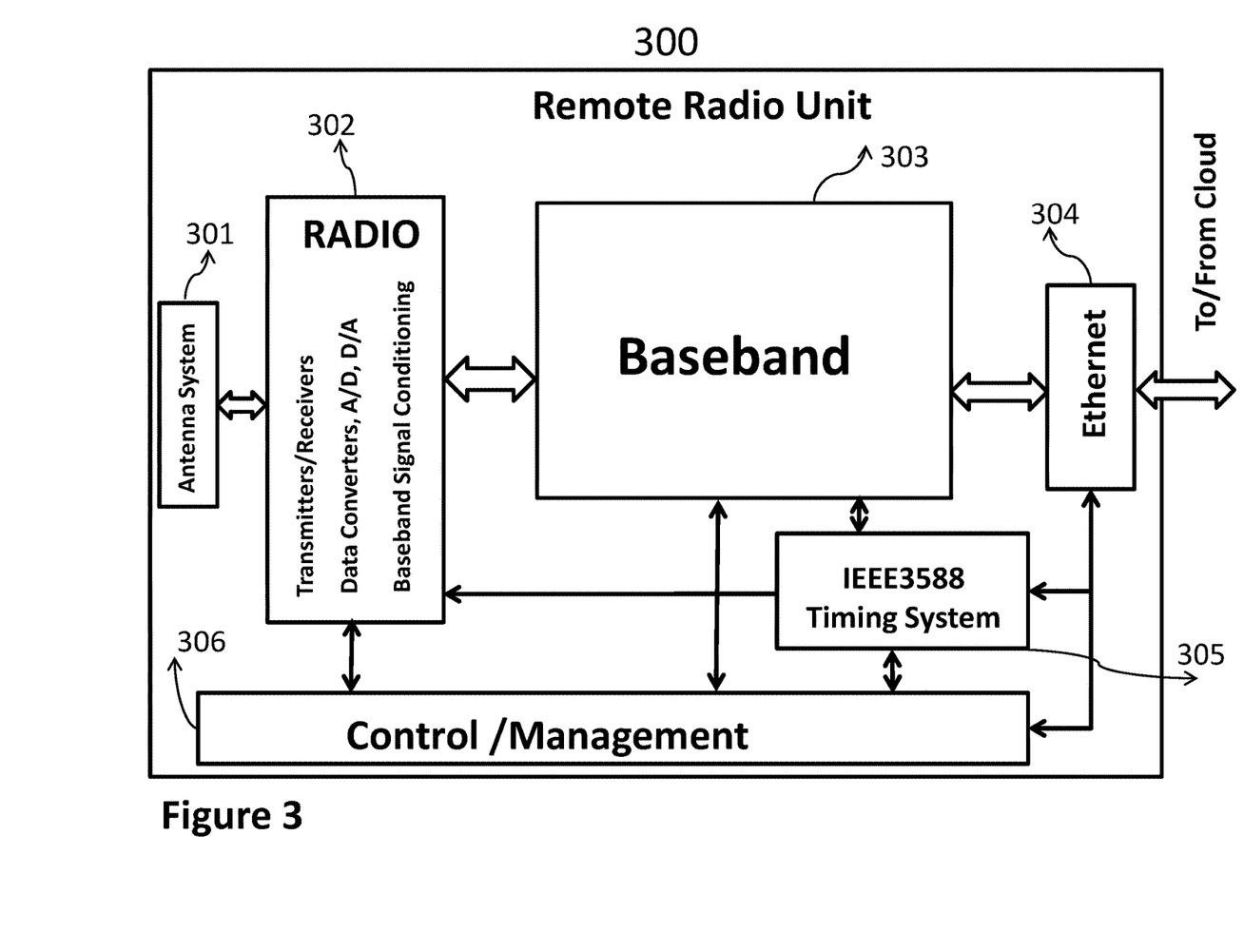
FIG. 3 depicts embodiments of a radio remote unit within the Cloud RAN architecture.

FIG. 3 illustrates the architecture of remote radio unit 300 within a cloud RAN. Remote radio unit 300 facilitates translation of analog wave signals received from antenna system 301 to digital baseband signals for transmission to the cloud using an asynchronous link and digital baseband signal from cloud through asynchronous link to analog wave signals to be transmitted by antenna system 301.

Remote radio unit 300 includes, among other things, antenna system 301, transmitters, receivers, data converters, and baseband signal conditioning (radio) block 302, baseband 303, Ethernet port 304, IEEE1588 timing system 305, and control/management 306.

The antenna system 301 comprises multiple antennas to support diversity, MIMO and multi-point operation. It could also provide filtering, power amplification and low noise amplification.

The radio 302 performs the task of down conversion of radio frequency signals received from antenna system 301 to baseband or low IF signals and up conversion of the baseband or IF signals to radio frequency signals to be transmitted by antenna system 301. The radio 302 does the task of analog to digital and digital to analog conversion. The baseband sample streams from/to data converter are conditioned in baseband signal conditioning. The baseband signal conditioning can perform AGC, crest factor reduction (CFR), digital pre-distortion (DPD), equalization, beam forming and other baseband signal conditioning.

The baseband sample signals received from cloud through asynchronous link for transmission by radio 302 and received from radio 302 for transmission to the cloud are processed in baseband 303.

The Ethernet block 304 provides the physical layer for the remote radio unit 300 Ethernet port.

The Ethernet block 304 identifies the IEEE1588 timing packets, control/management packets, and the baseband sample packets received from cloud and sends them to IEEE1588 timing system block 305, control/management block 306, and baseband block 303 respectively.

The Ethernet block 304 receives the IEEE1588 timing packets, control/management packets, and the baseband sample packets from IEEE1588 timing system block 305, control/management block 303, and baseband block 303 and sends them to the cloud.

The IEEE1588 timing system block 305 receives the timing packets from Ethernet block 304 and retrieves synchronization and time of the day information.

The IEEE1588 timing system 305 through the Ethernet block 304 communicates and exchanges timing packets with another node in the transport network to obtain and maintain synchronization and time of the day. The IEEE1588 timing system block 305 uses the clock synchronization information to create clocks and reference frequencies for the entire remote radio unit 300. The IEEE1588 timing system block 304 shares time of the day information with control/management block 306 and baseband block 303.

The control/management block 306 performs control and management of the remote radio unit 300. It helps to initialize all the blocks in remote radio unit 300 at power up or reset. The control/management block 306 based on control data received from cloud facilitates baseband sample stream formatting in baseband block 303.

FIG. 4 shows the architecture of a cloud RAN 400 supporting baseband pooling. In general, cloud RAN 400 facilitates communication between user equipments (UE) $401_1$ to $401_j$ and core network 406. Signals sent by UE $401_1$ to $401_j$ are received by remote radio units $402_1$ to $402_N$ and translated to baseband signal. The baseband signal from remote radio units $402_1$ to $402_N$ with IEEE1588 timing is sent through an asynchronous link to the cloud 403 that accommodates a pool of baseband resources 404, transport unit 405, core network 406, IEEE1588 system timing 407, control/management 408 and Ethernet port 409. The detected signals from pool of baseband resources 404 are transported to core network 406 by transport unit 405.

In one embodiment, the pool of baseband resources unit 404 uses memory blocks to store the received baseband sample streams from remote radios $402_1$ to $402_N$ based on their identifier, time tag or sequence number to avoid any early and late Ethernet packets. The memory size of the pool of baseband resource unit 404 is far more than the maximum delay jitter of Ethernet packets received from the remote radios $402_1$ to $402_N$.

In one embodiment, the pool of baseband resources unit 404 uses the timing and control information obtained from IEEE1588 system timing block 407 and control/management block 408 to format and combine various baseband sample streams for detection.

In one embodiment, the pool of baseband resources unit 404 uses the timing and control information obtained from IEEE1588 system timing block 407 and control/management block 408 to format, time stamp, number and tag various baseband sample streams for transmission to remote radio units $402_1$ to $402_N$.

In one embodiment, any of the remote radio units $402_1$ to $402_N$ can be a small cell, or one sector of a multi-sector macro-cell.

Figure 5:
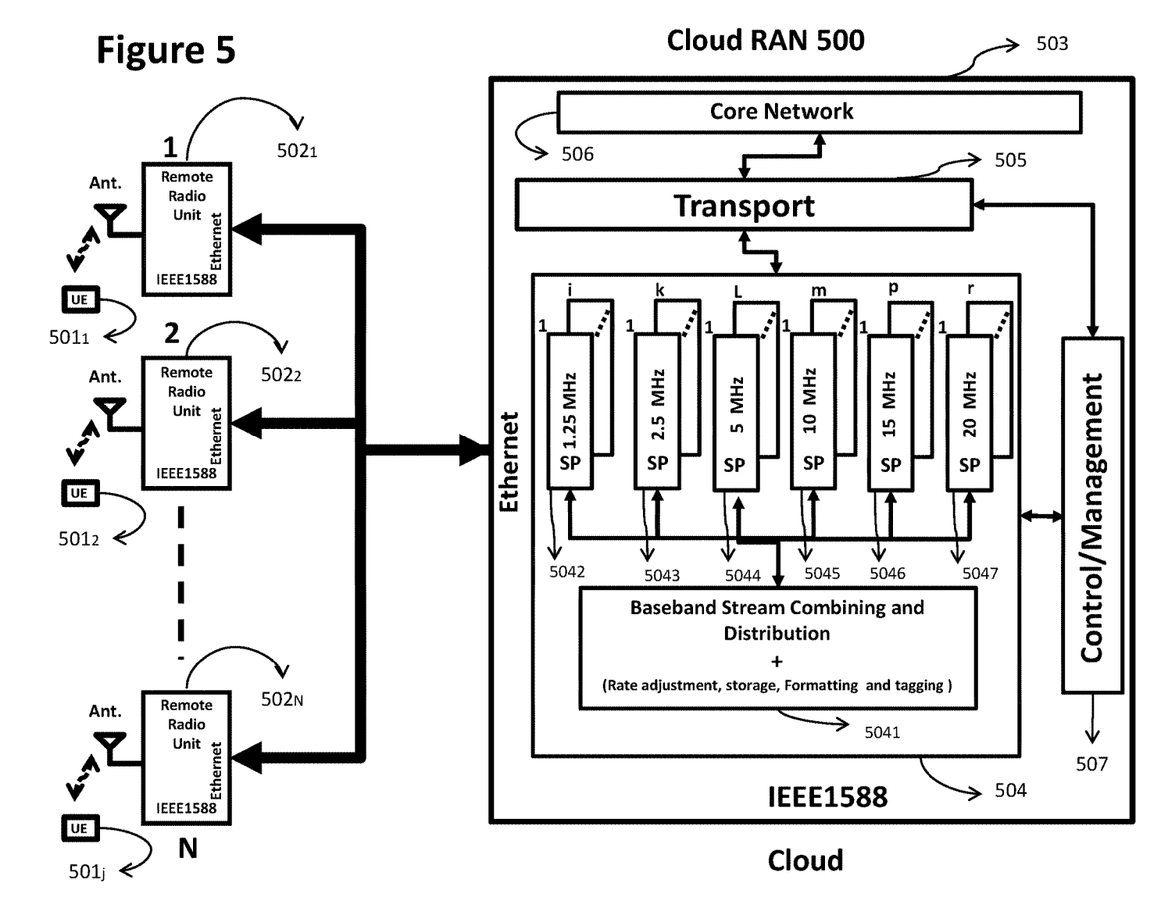
FIG. 5 shows an embodiment of baseband pooling within cloud RAN architecture.

FIG. 5 shows the architecture of a cloud RAN 500 supporting baseband pooling. In general, cloud RAN 500 facilitates communication between user equipments (UE) $501_1$ to $501_j$ and core network 506. Signals sent by UE $501_1$ to $501_j$ are received by remote radio units $502_1$ to $502_N$ and translated to baseband signal. The baseband signal from remote radio units $502_1$ to $502_N$ with IEEE1588 timing is sent through an asynchronous link to the cloud 503 that accommodates pool of baseband resources 504, transport unit 505, core network 506, and control/management 507. The detected signals from pool of baseband resources 504 are transported to core network 506 by transport unit 505.

In one embodiment, the baseband unit 504 within cloud 503 comprises of block 6041 (which performs baseband streams storing, formatting, rate adjustment, tagging, combining and distribution) and pool of channel baseband signal processing blocks (or channel signal processing blocks) 5042, 5043, 5044, 5045, 5046, and 5047 performing multiple LTE channel baseband signal processing (or channel signal processing) for 1.25 MHz, 2.5 MHz, 5 MHz, 10 MHz, 15 MHz, and 20 MHz LTE channel bandwidth respectively.

In one embodiment of baseband unit 504 within cloud 503, the signal processing block 5042 comprises of "i" ("i" is an integer) 1.25 MHz channel bandwidth LTE baseband signal processing elements (or channel signal processing elements) where one or more elements of block 5042 can be assigned to a single remote radio unit or multiple (sharing the same LTE channel baseband signal processing element) remote radio units within the pool of remote radio units $502_1$ to $502_N$.

In one embodiment of baseband unit 504 within cloud 503, the signal processing block 5043 comprises of "k" ("k" is an integer) 2.5 MHz channel bandwidth LTE baseband signal processing elements (or channel signal processing elements) where one or more elements of block 5043 can be assigned to a single remote radio unit or multiple (sharing the same LTE channel baseband signal processing element) remote radio units within the pool of remote radio units $502_1$ to $502_N$.

In one embodiment of baseband unit 504 within cloud 503, the signal processing block 5044 comprises of "l" ("l" is an integer) 5 MHz channel bandwidth LTE baseband signal processing elements (or channel signal processing elements) where one or more elements of block 5044 can be assigned to a single remote radio unit or multiple (sharing the same LTE channel baseband signal processing element) remote radio units within the pool of remote radio units $502_1$ to $502_N$.

In one embodiment of baseband unit 504 within cloud 503, the signal processing block 5045 comprises of "m" ("m" is an integer) 10 MHz channel bandwidth LTE baseband signal processing elements (or channel signal processing elements) where one or more elements of block 5045 can be assigned to a single remote radio unit or multiple (sharing the same LTE channel baseband signal processing element) remote radio units within the pool of remote radio units $502_1$ to $502_N$.

In one embodiment of baseband unit 504 within cloud 503, the signal processing block 5046 comprises of "p" ("p" is an integer) 15 MHz channel bandwidth LTE baseband signal processing elements (or channel signal processing elements) where one or more elements of block 5046 can be assigned to a single remote radio unit or multiple (sharing the same LTE channel baseband signal processing element) remote radio units within the pool of remote radio units $502_1$ to $502_N$.

In one embodiment of baseband unit 504 within cloud 503, the signal processing block 5047 comprises of "r" ("r" is an integer) 20 MHz channel bandwidth LTE baseband signal processing elements (or channel signal processing elements) where one or more elements of block 5047 can be assigned to a single remote radio unit or multiple (sharing the same LTE channel baseband signal processing element) remote radio units within the pool of remote radio units $502_1$ to $502_N$.

In one embodiment of the cloud RAN 500, the baseband unit 504 within the could 503 uses the traveling time of the Ethernet packets between cloud 503 and remote radio units $502_1$ to $502_N$ to adjust the UE $501_1$ to $501_j$ timings during initial access.

In one embodiment of the cloud RAN 500, the baseband unit 504 within the could 503, based on information related to traffic load on each remote ratio unit $502_1$ to $502_N$, received from control/management unit 507, transport unit 505 and higher layers, assigns to each remote radio unit $502_1$ to $502_N$ one or more LTE channel baseband signal processing elements (or channel signal processing elements) from pool of LTE channel baseband signal processing elements (or channel signal processing elements) in LTE blocks 5042 through 5047.

In one embodiment of the cloud RAN 500, the LTE channel baseband signal processing elements (or channel signal processing elements) assigned by baseband unit 504 within cloud 503 to one of the remote radio units $502_1$ to $502_N$ can be from one LTE channel baseband signal processing block (or channel signal processing block) or multiple LTE channel baseband signal processing blocks within LTE channel baseband signal processing blocks 5042 to 5047.

In one embodiment of the cloud RAN 500, the baseband unit 504 within the could 503 tags the baseband sample streams from LTE channel baseband signal processing elements of the LTE channel baseband signal processing blocks 5042 to 5047 with time of the day, sequence number, identification number and any other required information before transmitting them to remote radio units $502_1$ to $502_N$.

In one embodiment of the cloud RAN 500, the baseband unit 504 within the could 503, if needed truncate and decimate the baseband sample streams from LTE channel baseband signal processing elements of the LTE channel baseband signal processing blocks 5042 to 5047 before transmitting them to remote radio units $502_1$ to $502_N$.

In one embodiment of the cloud RAN 500, the baseband unit 504 within the could 503, if needed untruncate and interpolate the baseband sample streams received from remote radio units $502_1$ to $502_N$ before sending them to channel baseband signal processing elements of the LTE channel baseband signal processing blocks 5042 to 5047.

In one embodiment of the cloud RAN 500, the baseband unit 504 within the could 503, based on the traffic load of remote radio units $502_1$ to $502_N$, assigns the same (share one or more) LTE channel baseband signal processing elements from the pool of the LTE channel baseband signal processing blocks 5042 to 5047 to multiple or a group of remote radio units within the pool of remote radio units $502_1$ to $502_N$.

In one embodiment of the cloud RAN 500, the LTE channel signal processing elements assigned by baseband unit 504 within the cloud 503 to be shared by a group of remote radio units from pool of remote radio units $502_1$ to $502_N$ can be from one LTE channel baseband signal processing element or multiple LTE channel baseband signal processing element within LTE channel baseband signal processing blocks 5042 to 5047.

In one embodiment of the cloud RAN 500, when one LTE channel baseband signal processing element from one of the LTE channel baseband signal processing blocks 5042 to 5047 is shared by a group of remote radio units from pool of remote radio units $502_1$ to $502_N$, the baseband unit 504 within the could 503 transmits the baseband sample streams from the shared LTE channel baseband signal processing element to all the remote radio units that share the LTE channel baseband signal processing element.

In one embodiment of the cloud RAN 500, when one LTE channel baseband signal processing element (or channel signal processing elements) from one of the LTE channel baseband signal processing blocks 5042 to 5047 is shared by multiple or a group of remote radio units from pool of remote radio units $502_1$ to $502_N$, the baseband unit 504 within the could 503 before transmitting the baseband sample streams to remote radio units, tags the baseband sample streams from the shared LTE channel baseband signal processing element with time of the day, sequence number, identification number and any other required information for sharing.

In one embodiment of the cloud RAN 500, when an LTE channel baseband signal processing element from one of the LTE channel baseband signal processing blocks 5042 to 5047 is shared by multiple or a group of remote radio units from pool of remote radio units $502_1$ to $502_N$, the baseband unit 504 within the could 503 if needed performs bit truncation and sampling rate decimation before transmitting the baseband sample streams to remote radio units sharing the LTE channel baseband signal processing element.

In one embodiment of the cloud RAN 500, the remote radio units $502_1$ to $502_N$, based on the tag information of baseband sample streams received from the cloud 503, format the baseband sample streams and transmit them to the UE $501_1$ to $501_j$.

In one embodiment of the cloud RAN 500, when a group of remote radio units from the pool of remote radio units $502_1$ to $502_N$ share one or multiple LTE channel baseband signal processing elements from baseband unit 504 within cloud 503, based on the tag information of the baseband sample streams from shared LTE channel baseband signal processing elements in the cloud 503 received by the group of remote radio units, the group of remote radio units format the baseband sample streams and if needed synchronize them among the group of remote radio units before transmitting them to the UEs within UE $501_1$ to $501_j$ that use the group of remote radio units.

In one embodiment of the cloud RAN 500, the remote radio units $502_1$ to $502_N$ tag the baseband signal streams received from UE $501_1$ to $501_j$ with time of the day, sequence number, identification number and any other required information before transmitting them to cloud 503.

In one embodiment of the cloud RAN 500, the remote radio units $502_1$ to $502_N$ if needed truncate and rate decimate the baseband sample streams received from UE $501_1$ to $501_j$ before transmitting them to cloud 503.

In one embodiment of the cloud RAN 500, the received baseband sample streams from the remote radio units $502_1$ to $502_N$ at the baseband unit 504 within the cloud 503 are sorted out and formatted base on their tag information and sent to their associated LTE channel baseband signal processing element in one of the LTE channel baseband signal processing blocks 5042 to 5047 for detection.

In one embodiment of the cloud RAN 500, the received baseband sample streams at the baseband unit 504 within the cloud 503 from the group of remote radio units within pool of remote radio units $502_1$ to $502_N$ that share one LTE channel baseband signal processing element are sorted out, formatted and synchronized base on their tag information, combined, and sent to the shared LTE channel baseband signal processing element in one of the LTE channel baseband signal processing blocks 5042 to 5047 for detection.

In one embodiment of the cloud RAN 500, any individual remote radio unit within pool of remote radio units $502_1$ to $502_N$ can operate over the air at any carrier frequency from any frequency band in the frequency spectrum.

In one embodiment of the cloud RAN 500, any individual channel baseband signal processing element, within one of the LTE channel baseband signal processing blocks 5042 to 5047, supporting a particular channel bandwidth, can simultaneously transmit and receive to/from multiple of RRUs within pool of remote radio units $502_1$ to $502_N$ operating at different frequency carriers in the frequency spectrum.

In one embodiment of the cloud RAN 500, the group of UEs within UE $501_1$ to $501_j$ that communicate with group of remote radio units from pool of remote radio units $502_1$ to $502_N$ that share the same LTE channel baseband signal processing element within LTE channel baseband signal processing blocks 5042 to 5047 could be asked by cloud 503 to lower their modulation level or coding rate to improve the signal-to-noise ratio at the LTE channel baseband signal processing element serving the remote radio units.

Various embodiments are thus described. While particular embodiments have been described, it should be appreciated that the embodiments should not be construed as limited by such description, but rather construed according to the following claims.

The invention claimed is:

1. A Cloud Radio Access Network (CRAN) system comprising:
   a cloud that supports a cloud Institute of Electrical and Electronics standard 1588 (IEEE1588) timing to obtain a time of the day, and synchronize with the network, and consists of a control/management block, a centralized baseband unit, a transport layer block and a core network;
   a remote radio unit (RRU) in a plurality of RRU with a RRU configuration that supports at least one of small cell and macro cell, and a RRU IEEE1.588 timing that assists to synchronize with the cloud, obtain the time of the day, and time stamp a transmit signal to the cloud;
   an asynchronous link between the cloud and said plurality of RRUs that uses a packet protocol to encapsulate a baseband sample stream, and a control/management signal and carry them between the RRU and the cloud;
   said centralized baseband unit in the cloud performs time alignment for the baseband sample stream to and from the RRU using the baseband sample stream time stamp, carries out rate adjustment for said baseband sample stream to reduce the asynchronous link transmission bandwidth, at least one of tags, stores, formats, combines, and distributes said baseband sample stream, and performs a baseband signal processing for at least one of 1.4 MHz, 2.5 MHz, 5 MHz, 7.5 MHz, 10 MHz, 15 MHz, and 20 MHz, channel bandwidths.

2. The CRAN of claim 1, wherein the asynchronous link uses Ethernet packet protocol to encapsulate the baseband sample stream and control/management signal.

3. The CRAN of claim 1, wherein the RRU configuration is at least one of residential, enterprise, and public single/multi-sector.

4. The CRAN of claim 1, wherein sharing of the baseband signal processing resources is based on said RRU configuration and traffic load.

5. The CRAN of claim 1, wherein the RRU uses a node that supports IEEE1588 in the network different from the cloud node to synchronize with the cloud.

6. The CRAN of claim 1, wherein said RRU IEEE1588 and the cloud IEEE1588 are used to estimate and calculate a packet traveling time between the cloud and the RRU.

7. The CRAN of claim 1, wherein the packet traveling time between the cloud and the plurality of RRUs is used to line up the baseband sample streams received by the cloud from the plurality of RRUs before combining and time the baseband sample streams transmitted to the plurality RRUs for simultaneous transmission over the air by the RRUs.

8. The CRAN of claim 1, wherein the centralized baseband unit provides the baseband signal processing for the plurality of RRUs with said RRU configuration.

9. The CRAN of claim 1, wherein the baseband sample streams received at the cloud from the plurality of RRUs are combined before sending to said baseband signal processing shared by them.

10. The CRAN of claim 1, wherein said RRU in the plurality of RRUs operates over the air at least at one of carrier frequencies within at least one of frequency bands in the frequency spectrum.

11. A centralized baseband unit in a cloud comprising:
a plurality of channel baseband signal processing blocks that each block supports a plurality of baseband signal processing channel elements at different channel bandwidths;
a memory block that stores a received baseband sample stream from a Radio Remote Unit (RRU) within a plurality of Remote Radio Units (RRU);
a sample rate adjustment block to adjust the rate of the received baseband sample stream;
a sample resolution adjustment block to adjust the resolution of the received baseband sample stream;
a formatting block to format the received baseband sample streams based on their time stamp, sequence number and the RRU identity code;
a baseband sample combining block to combine the received baseband sample streams from a group of RRUs in the plurality of RRUs and send them to said baseband signal processing channel element shared by said group of RRUs;
said baseband signal processing channel element processes the received baseband signal streams, detects an information data bits, and sends the appropriate information data bits to a control/management block and a transport layer;
said baseband signal processing channel element modulates an information data bits received from the transport layer and the control/management block and creates a transmit baseband sample streams;
a baseband sample distribution block to distribute the transmit baseband sample streams to the said group of RRUs supported by the baseband signal processing channel element;
said memory block stores said transmit baseband sample streams;
said sample rate adjustment block to adjust the rate of the transmit baseband sample stream;
said sample resolution adjustment block to adjust the resolution of the transmit baseband sample stream;
said formatting block to format and tag said transmit baseband sample streams based on their sequence number, time stamp, and the RRU identity code before sending them to said group of RRUs.

12. The centralized baseband unit explained in claim 11, wherein the memory block has large memory size to compensate for delay jitter in an asynchronous link between the cloud and the RRU within the plurality of RRUs.

13. The centralized baseband unit explained in claim 11, wherein the rate adjustment block adjusts the rate of the received baseband sample streams and the transmit baseband sample streams using decimation/interpolation, and the sample resolution adjustment block adjusts resolution of the received baseband sample streams and said transmit baseband sample stream using truncation and untruncation.

14. The centralized baseband unit explained in claim 11, wherein the formatting block in the centralized baseband unit uses timing information provided by an Institute of Electrical and Electronics standard 1588 (IEEE1588), control information from said control and management block and a packet traveling time information between the cloud and the RRU within the plurality of RRUs to format the received baseband sample streams and the transmit baseband sample streams.

15. The centralized baseband unit explained in claim 11, wherein the baseband sample combining block combines the formatted received baseband sample streams from the group of RRUs within the plurality of RRUs based on the information from the control and management block and then sends the result to the appropriate baseband signal processing channel element for further signal processing.

16. The centralized baseband unit explained in claim 11, wherein the plurality of channel baseband signal processing elements with the same bandwidth supports at least one of fourth Generation (4G) Long Term Evolution (LTE), fifth Generation (5G), and LTE advanced pro.

17. The centralized baseband unit explained in claim 11, wherein said baseband signal processing channel element within the plurality of baseband signal processing blocks supports said group of RRU in the plurality of RRUs based on the RRU traffic load and configuration.

18. The centralized baseband unit explained in claim 11, wherein the plurality of baseband signal processing channel elements supports at least one of channel bandwidths 1.25 MHz, 2.5 MHz, 5 MHz, 10 MHz, 15 MHz, and 20 MHz.

19. The centralized baseband unit explained in claim 11, wherein said baseband signal processing channel element supporting a particular channel bandwidth simultaneously transmits to and receives from said group of the RRUs when the RRUs operate at different frequency carriers in the frequency spectrum.

20. The centralized baseband unit explained in claim 11, wherein the control and management unit in the cloud based on the performance of said baseband signal processing channel element requests from a user equipments (UE) that uses the baseband signal processing channel element to lower its modulation level or coding rate to improve the signal-to-noise ratio at the baseband signal processing channel element serving the UE.

* * * * *